(No Model.)

S. S. WOOD.
MACHINE FOR CUTTING ELLIPTICAL FIGURES FROM SHEET METAL.

No. 556,393. Patented Mar. 17, 1896.

Witnesses
Della Balch
Estella Akin

Inventor
Samuel S. Wood
By his Attorney
Henry F. Noyes

UNITED STATES PATENT OFFICE.

SAMUEL S. WOOD, OF ELGIN, ILLINOIS.

MACHINE FOR CUTTING ELLIPTICAL FIGURES FROM SHEET METAL.

SPECIFICATION forming part of Letters Patent No. 556,393, dated March 17, 1896.

Application filed July 25, 1895. Serial No. 557,110. (No model.)

*To all whom it may concern:*

Be it known that I, SAMUEL S. WOOD, of Elgin, Kane county, Illinois, have invented a certain new and useful Machine for Cutting Elliptical Figures out of Sheet Metal, of which the following is a specification.

The object of my invention is to provide an economical and efficient machine adapted to cut sheet metal or other similar material into figures of elliptical outline, and which may be adjusted to make the larger and smaller diameters of the ellipses any convenient length required. The mechanism I have invented for this purpose is fully shown and set forth in the accompanying drawings.

Figure 1:
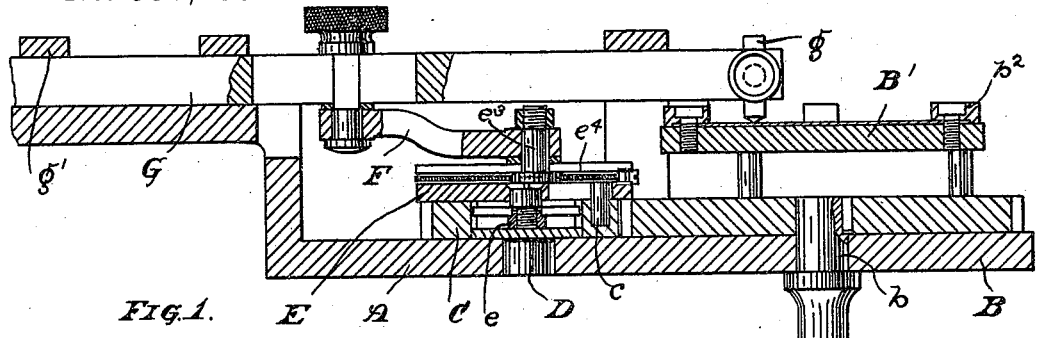
Figure 2:
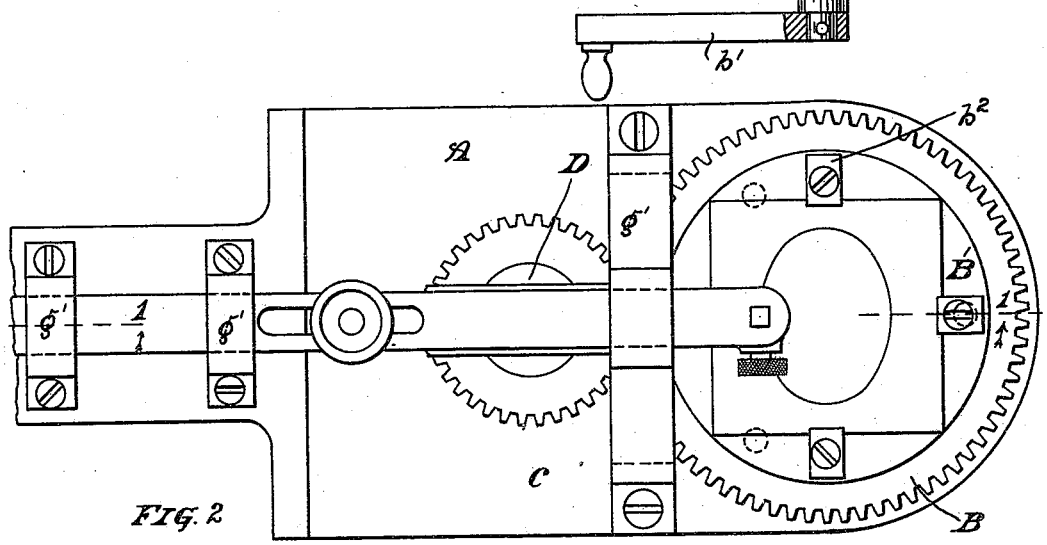
Figures 3, 4, 5:
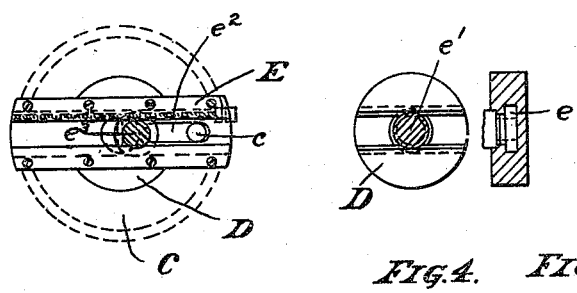

Figure 1 is a vertical sectional elevation of my machine on line 11 of Fig. 2. Fig. 2 is a plan of the machine; Fig. 3, a detail plan of the ring-gear and its arm; and Fig. 4 a detail plan, and Fig. 5 a section, of the stud on which this ring-gear revolves.

The bed consists of a main casting A provided with suitable supports of usual construction and therefore not shown in the drawings. Near one end of this bed I provide a gear-wheel B, to which is keyed a spindle $b$, and fastened to the spindle is a crank-arm $b'$ or other construction suitable for revolving the gear. This gear has firmly fastened to it the plate B', which is provided with clamps $b^2$, adapted to hold the material to be cut firmly in place. Meshing with and driven by the gear B is the ring-gear C, which revolves on a stud D and has a pin $c$ firmly fastened to it. Just above and operated by the ring C is the arm E, which performs the functions of a crank-arm.

The stud D has a T-shaped slot planed in it, as shown in section in Fig. 5, and in this slot is a nut $e$, adapted to fasten a pin $e'$, and on this pin the arm E revolves when actuated by the pin $c$ of the ring C; and a slot $e^2$ is provided in the arm for this pin $c$ to work in. It will be evident that by loosening the pin $e'$ in its nut $e$ the center of rotation of the arm can be changed by moving the pin $e'$ whichever way may be desired.

The arm E is provided with a T-shaped slot in which is situated the pin $e^3$, and to adjust this pin in the slot I provide a screw $e^4$, working in the head of pin $e^3$, and by turning the screw to the right or left the pin $e^3$ can be adjusted at will. The pin $e^3$ has a bearing in the connecting-bar F, and the bar F is pivoted to the slide G, which carries the cutter $g$ and is guided by the brackets $g'$.

If the bar F were disconnected and the slide G firmly fastened it is evident that the cutter would mark a circular path on the material to be cut when the plate B' is revolved. When the bar F is connected, the ring-gear being so proportioned as to make two revolutions to one of the large gear, the pin $e^3$ gives the arm F and slide G a throw equal to the diameter of the circle described by the pin $e^3$ about the pin $e'$. Thus the cutter travels in and out twice during one revolution of the bed-plate and the distance between the two innermost points, which are diametrically opposite each other, will be the shortest diameter of the ellipse, and the distance between the two outer points the longest diameter. By making the throw greater or smaller, ellipses of different shapes can be traced, and by changing the center of rotation of the arm E the curves may be flattened or made more full, as when the pin $e'$ is not adjusted at the center of the ring C the pin $c$ gives the arm E a motion similar to the "quick-return motion," and hence distorts the shape of the ellipse more or less, as the case may be, and by changing the relative positions a greater amount, figures of different outlines may be marked.

While I have described my invention with more or less completeness as regards the details thereof, I do not desire to be limited thereto unduly, as I contemplate all proper changes of form, omission of parts, and the substitution of equivalents as circumstances may suggest or necessity renders expedient.

I claim—

1. In a machine for cutting elliptical figures, the combination of a table adapted to carry the material to be cut, a driving-gear to operate said table, a means of rotating said gear, a second gear driven by said driving-gear, an arm connected to said second gear and provided with an adjustable center of rotation, a slide carrying a suitable cutter, and connections between said arm and said slide, substantially as described.

2. In a mechanism for cutting elliptical figures, the combination of a table adapted to carry the material to be cut, a driving-gear firmly fastened to said table, a means of rotating said gear, a ring-gear operated by said driving-gear and rotating upon a suitable stud, an arm having a center of rotation within and driven by said ring-gear, a slide provided with a suitable cutter, and a connecting-bar adjustably connected to said slide, and adjustably connected to said arm, substantially as described.

3. In a machine for cutting elliptical figures, the combination of a table adapted to carry the material to be cut, a driving-gear firmly fastened to said table, a ring-gear operated by said driving-gear and rotating upon a suitable stud an arm having an adjustable center of rotation in said stud and driven by said ring-gear, a slide provided with a suitable cutter, and a connecting-bar adjustably connected to said slide, and adjustably connected to said arm, substantially as described.

4. In a machine for cutting elliptical figures, the combination of a table, a gear firmly fastened to such table, a means of rotating such gear, a ring-gear driven by the driving-gear and rotating upon a suitable stud, an arm having an adjustable center of rotation within such stud, a pin in such ring-gear adapted to rotate such arm, a slide provided with a suitable cutter, and a connecting-bar adjustably connected to said slide, and adjustably connected to said arm, substantially as described.

SAMUEL S. WOOD.

Witnesses:
WM. F. ZIMMERMAN,
HENRY F. NOYES.